United States Patent [19]

Madison

[11] Patent Number: 4,660,498
[45] Date of Patent: Apr. 28, 1987

[54] METHOD OF REINFORCING FLEXIBLE PLASTIC

[75] Inventor: George B. Madison, Wichita, Kans.

[73] Assignee: The Coleman Company, Inc., Wichita, Kans.

[21] Appl. No.: 613,051

[22] Filed: May 22, 1984

[51] Int. Cl.⁴ .................. B63B 5/24; B29C 51/10; B29C 51/12
[52] U.S. Cl. ............................ 114/347; 114/357; 264/511; 264/516
[58] Field of Search ............... 264/510, 512, 511, 516; 114/347, 357, 65 R

[56] References Cited

U.S. PATENT DOCUMENTS

| | | | |
|---|---|---|---|
| 2,807,811 | 10/1957 | Atkinson et al. | 114/357 |
| 2,876,498 | 3/1959 | Nason | 264/516 |
| 3,070,817 | 1/1963 | Kohrn et al. | 114/357 |
| 3,611,461 | 10/1971 | Wurzberger | 114/357 |
| 4,307,059 | 12/1981 | Cambio | 264/516 |
| 4,323,411 | 4/1982 | Uhlig | 264/516 X |

FOREIGN PATENT DOCUMENTS

| | | | |
|---|---|---|---|
| 51-30867 | 3/1976 | Japan | 264/516 |
| 1003032 | 9/1965 | United Kingdom | 114/357 |

OTHER PUBLICATIONS

E. J. Grossmith, "Vacuum Forming Products having Insert Pins", *IBM Technical Disclosure Bulletin*, vol. 16, No. 11, 4–1974, p. 3825.

*Primary Examiner*—Jan H. Silbaugh
*Assistant Examiner*—Hubert C. Lorin

[57] ABSTRACT

Flexible plastic such as polyethylene is reinforced by molding the plastic over a reinforcing member. The reinforcing member is provided with at least one undercut between the plastic and the mold, and the plastic is molded into the undercut so that the plastic and the reinforcing member are interconnected.

1 Claim, 22 Drawing Figures

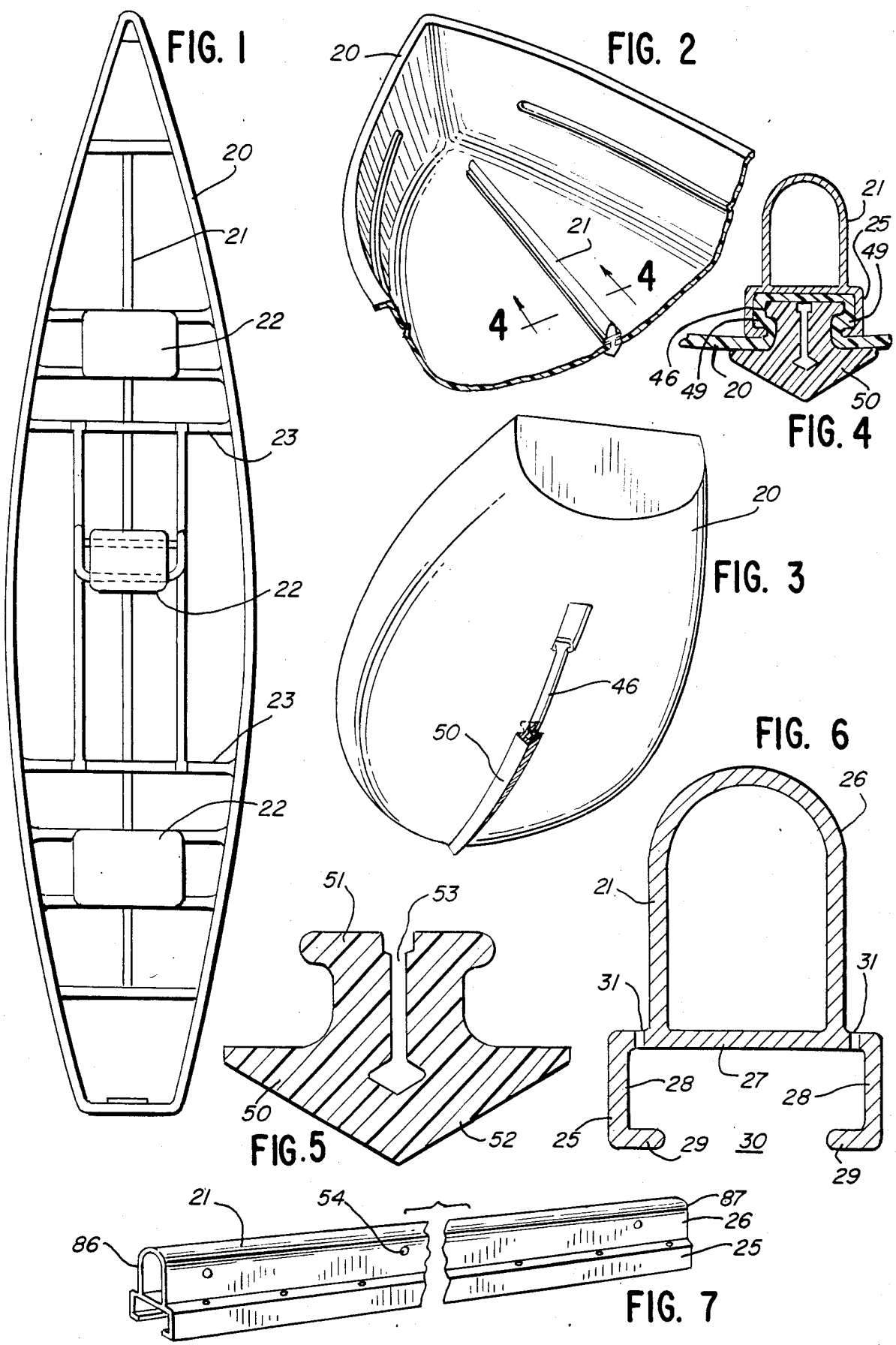

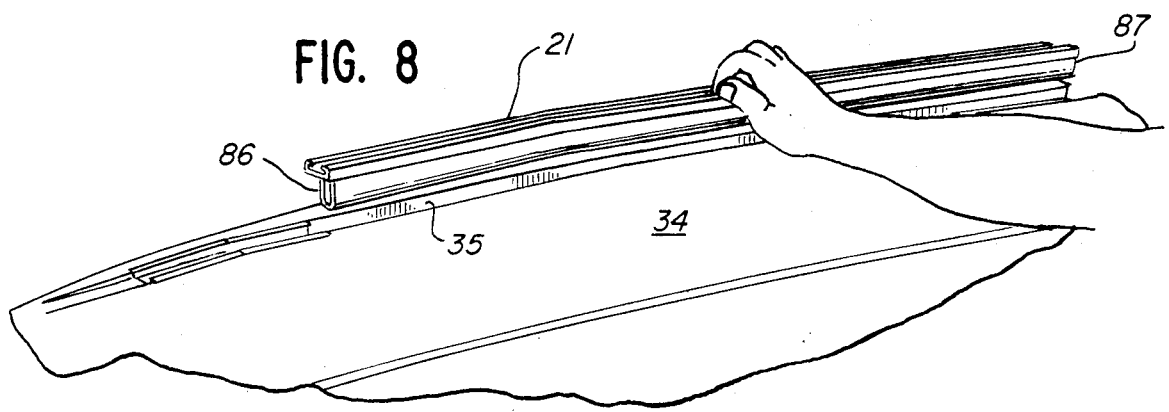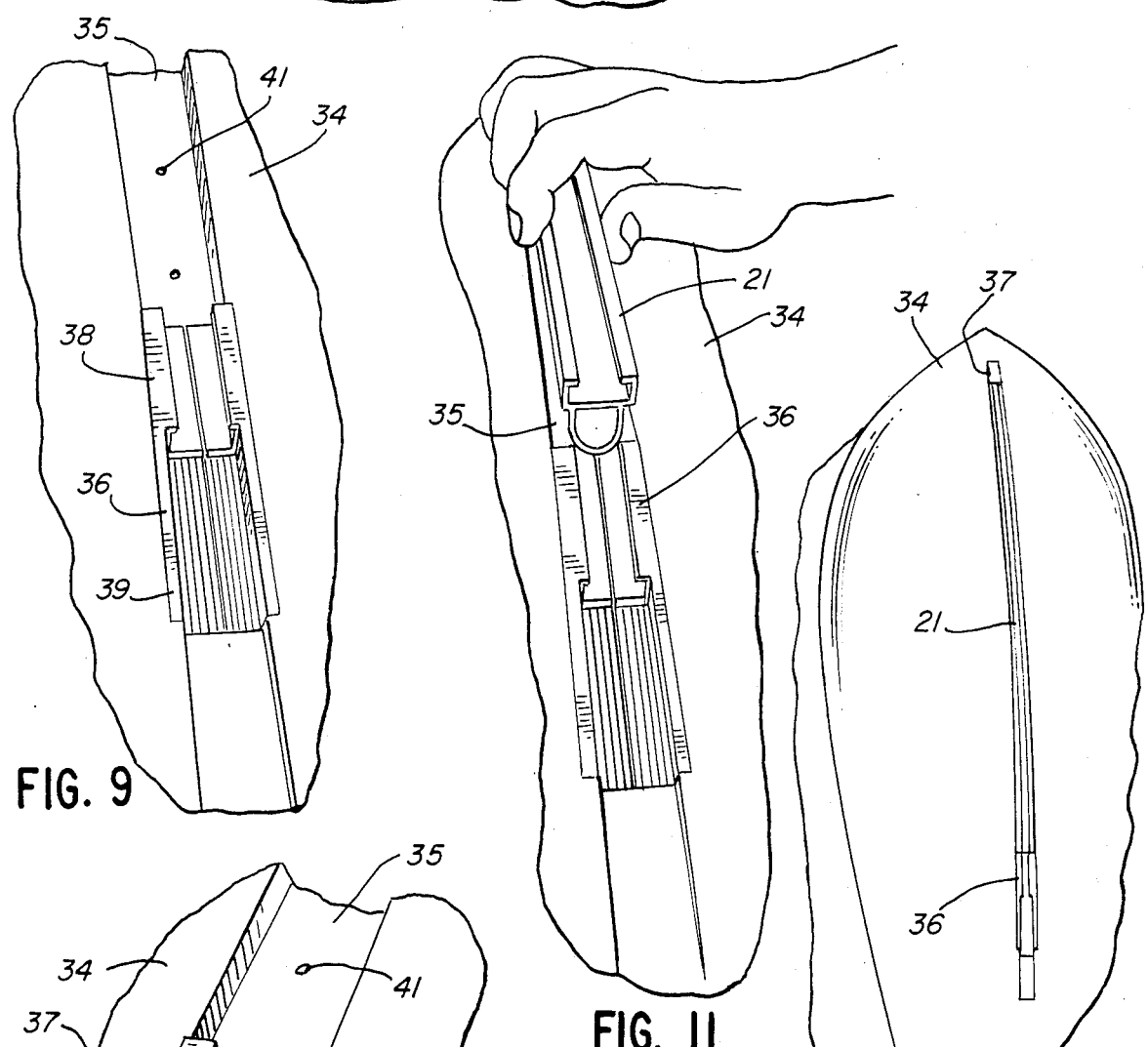

FIG. 13
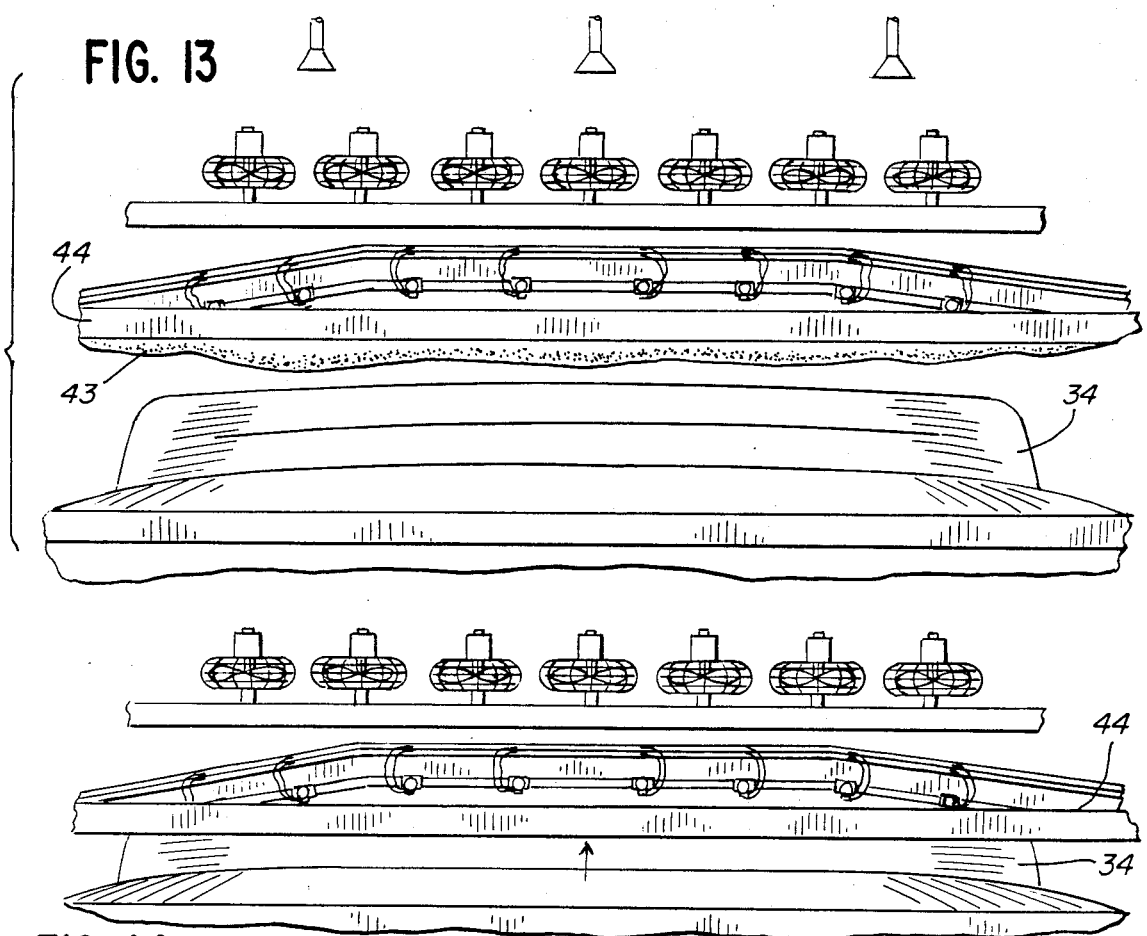
FIG. 14
FIG. 15
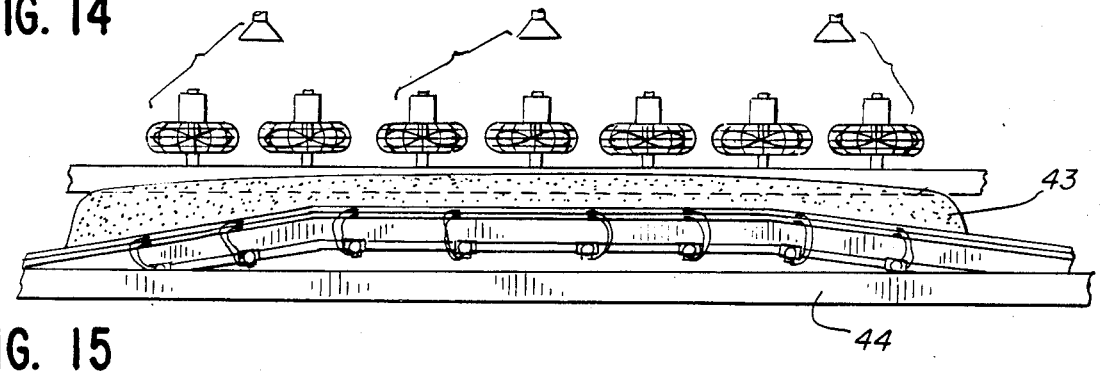
FIG. 16
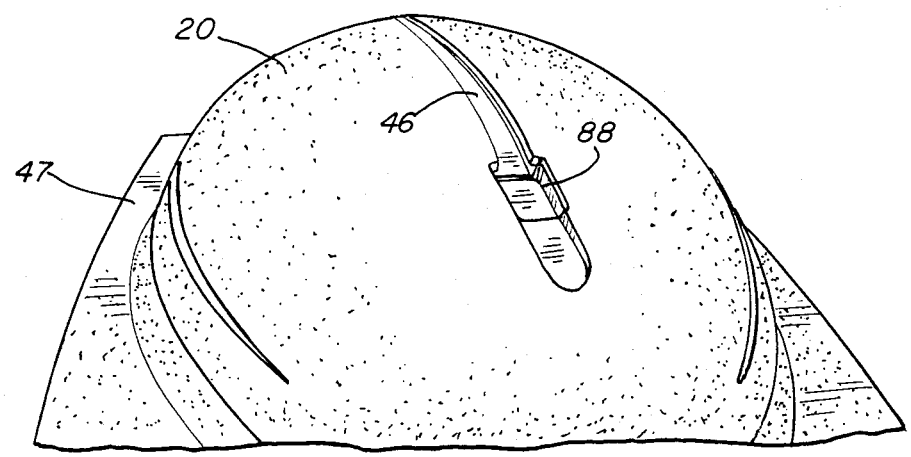

4,660,498

METHOD OF REINFORCING FLEXIBLE PLASTIC

BACKGROUND

This invention relates to molded plastic articles, and, more particularly, to a method of reinforcing molded plastic articles.

A wide variety of articles are molded from plastic, and one particularly popular plastic is polyethylene. Polyethylene is inexpensive yet has many desirable physical characteristics such as high impact strength under a wide range of temperatures, good abrasion, good weatherability, and ease of cleaning. These and other properties can be improved or optimized by using various additives as is well known in the art.

However, one of the problems with polyethylene is that it is difficult to join other materials to polyethylene. The smooth surface of polyethylene does not provide good adhesive bonding, and any fasteners which are inserted through the polyethylene would cause stress concentrations and would be a potential area for leaks. Also, polyethylene has a higher thermal expansion than most other materials, and differing rates of thermal expansion between polyethylene and another material attached to it could affect the attachment.

Another difficulty with polyethylene is that it is not rigid and cannot be used for structural parts with out reinforcement. However, if a reinforcing member is attached to the polyethylene, the different rates of thermal expansion could cause problems.

SUMMARY OF THE INVENTION

The invention provides a method for attaching a reinforcing member to polyethylene and other plastics without fasteners. The reinforcing member is placed on a mold for the plastic, and the reinforcing member is shaped to provide at least one undercut above the mold. The plastic is molded over the reinforcing member and into the undercut so that the plastic is interconnected with the reinforcing member. The reinforcing member therefore provides structural strength to the plastic, but, since the plastic is not anchored or fastened to the reinforcing member, the plastic is free to expand relative to the reinforcing member. The reinforcing member also provides a location to attach other structural parts to the reinforced plastic.

DESCRIPTION OF THE DRAWING

The invention will be explained in conjunction with an illustrative embodiment shown in the accompanying drawing, in which FIG. 1 is a top plan view of a molded plastic canoe formed in accordance with the invention;

FIG. 2 is a fragmentary perspective view, partially broken away, of the bow of the canoe;

FIG. 3 is a bottom perspective view of the stern of the canoe;

FIG. 4 is an enlarged sectional view taken along the line 4—4 of FIG. 2;

FIG. 5 is an enlarged sectional view of the keel attachment;

FIG. 6 is an enlarged sectional view of the reinforcing members;

FIG. 7 is a perspective view, partially broken away, of the reinforcing member;

FIG. 8 is a fragmentary perspective view showing the reinforcing member being placed on the mold;

FIG. 9 is a fragmentary perspective view showing one end of the groove in the mold for the reinforcing member;

FIG. 10 is a fragmentary perspective view showing the other end of the groove in the mold;

FIG. 11 is a fragmentary perspective view showing the reinforcing member being placed in the groove of the mold;

FIG. 12 is a fragmentary perspective view of the mold and the reinforcing member;

FIG. 13 is a fragmentary side elevational view showing a heated sheet of plastic suspended above the mold;

FIG. 14 is a view similar to FIG. 13 showing the mold being moved upwardly into contact with the heated plastic sheet;

FIG. 15 illustrates the mold and the plastic sheet during the molding operation;

FIG. 16 is a fragmentary perspective view of the raw molded canoe after it has been removed from the mold.

DESCRIPTION OF SPECIFIC EMBODIMENTS

Figure 17:
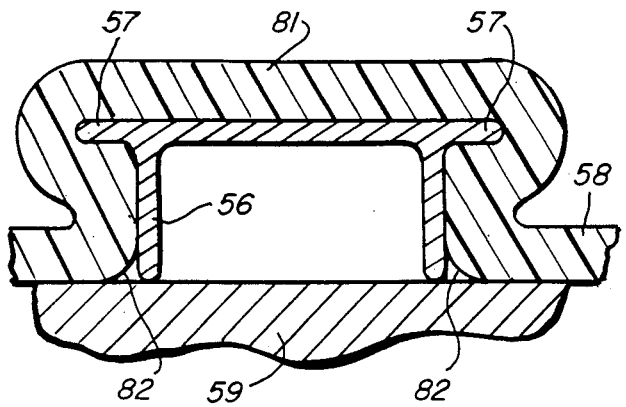
FIGS. 17-22 illustrate alternate shapes of reinforcing members.

The invention will be explained in conjunction with a molded polyethylene canoe. However, it will be understood that the invention is applicable to a wide variety of plastic parts which can be molded from polyethylene or other plastics.

FIG. 1 is a top plan view of a molded polyethylene canoe 20 which is similar to prior art molded canoes with the exception of the keelson 21 which extends longitudinally along the centerline of the canoe. A keelson is necessary in molded plastic canoes to reinforce the plastic and to provide a location for attaching the supports for the seats 22 and the athwart tubes 23 which reinforce the gunwales.

In prior molded plastic canoes of the type illustrated in FIG. 1, the keelson was positioned in a groove along the keel of the boat but was not connected to the plastic. This caused the canoe to be less rigid than was desired and allowed the plastic to deform during extended storage. The deformation adversely affects the hydrodynamic shape of the hull.

As will be explained in detail hereinafter, the keelson 21 is physically interconnected with the plastic but is not fastened thereto. The keelson therefore provides excellent rigidity to the canoe while permitting expansion of the plastic relative to the keelson.

Referring to FIGS. 6 and 7, the particular keelson illustrated is extruded from aluminum and includes a channel-shaped portion 25 and a U-shaped attaching portion 26. The channel-shaped portion 25 includes a top wall 27, a pair of parallel side walls 28, and a pair of laterally inwardly extending flanges 29. The laterally extending flanges 29 provide a mouth 30 for the channel which is narrower than the width of the channel between the side walls 28. A plurality of longitudinally spaced openings 31 are provided in the top wall 27 outwardly of the U-shaped attaching portion 26.

Referring now to FIGS. 8-12, a vacuum mold 34 in the shape of the canoe is provided with a longitudinally extending groove 35 in the portion of the mold which corresponds to the keel of the canoe. The groove is sized to permit the keelson 21 to be inserted upside down into the groove with the laterally extending flanges 29 flush with the adjacent surfaces of the mold. As will be explained hereinafter, a pair of inserts 36 and 37 (FIGS. 9 and 10) are inserted into the bow and stern ends, respectively, of the groove in the mold to prevent plastic from flowing into the U-shaped attaching portion 26 of the keelson. The bow insert 36 includes a channel-shaped top portion 38 which mates with the channel portion 25 of the keelson and an inclined ramp portion 39 which fits into the upwardly inclined bow end of the groove 35. The stern insert 37 includes a channel-shaped top portion which mates with the channel of the keelson.

The keelson 21 fits freely into the groove between the two inserts 36 and 37 as illustrated in FIG. 11. FIG. 12 shows the mold after the keelson is positioned in the mold.

The mold 34 is a conventional vacuum mold except for the groove 35. The particular mold illustrated is formed from wood, and a plurality of holes in the mold are connected to a source of vacuum. In many vacuum molds the entire inside cavity of the mold is evacuated. However, in the mold shown in the drawings a plurality of copper tubes are attached to the surface of the inside cavity of the mold, and holes are drilled through the mold and into the tubes. The tubes are then connected to a vacuum pump. The holes are arranged in longitudinally extending rows on the surface of the mold, and longitudinally spaced holes 41 (FIGS. 9 and 10) are located in the groove 35.

In FIG. 13 a heated sheet 43 of polyethylene plastic is suspended by a conventional frame 44 above the mold 34. The frame initially supports the plastic in an oven, and after the sheet is heated sufficiently, the frame is moved over the mold. In FIG. 14 the mold is being moved upwardly into the soft plastic sheet, and the sheet drapes over the mold. In FIG. 15 the mold has been moved upwardly within the frame 44, and the space between the plastic sheet and the mold is evacuated to draw the polyethylene against the mold.

A vacuum is drawn in the groove 35 through the openings 41, and the channel 25 of the keelson 21 is evacuated through the openings 31 (FIG. 6). The plastic is thereby drawn into the channel and conforms to the shape thereof. The laterally inwardly extending flanges 29 of the channel form a pair of undercuts between the plastic and the mold, and the plastic is drawn under the undercuts by the vacuum. The portions of the plastic which extend laterally outwardly below the undercuts provide interconnecting portions which prevent the cooled plastic from being withdrawn from the channel and provide a physical interconnection between the plastic and the keelson.

FIG. 16 illustrates the canoe after it is removed from the mold. The molded canoe includes a groove 46 which corresponds to the interior of the channel 25 of the keelson and the interiors of the corresponding channels in the inserts 36 and 37. The two inserts 36 and 37 are removed from the inside of the canoe by sliding them off of the grooved portion of the canoe before the plastic cools, allowing the plastic to shrink past the ends 86 and 87 (FIGS. 7 and 11) of the keelson without damage. The bow end 88 (FIG. 16) of groove 46 includes a portion formed by insert 36 that tapers into the canoe hull so as to provide a lead into groove 46 to accept a plastic keel attachment 50 (FIG. 4). The inserts 36 and 37 can be reinserted into the groove in the mold for the next molding operation. The canoe is finished by trimming the excess plastic 47 from the sides of the canoe.

FIG. 4 is a sectional view showing the interconnection between the molded canoe 20 and the channel 25 of the keelson 21. The groove 46 in the bottom of the canoe is T-shaped and includes a pair of laterally outwardly extending connecting portions 49. A plastic keel attachment 50 is inserted into the groove 46. The keel attachment includes a T-shaped attaching portion 51 (FIG. 5) and a V-shaped bottom portion 52 which extends downwardly from the bottom of the canoe. A longitudinally extending slit 53 is provided in the attaching portion 51 to provide a pair of flexible halves to facilitate insertion of the attaching portion into the groove in the canoe. The keel attachment can advantageously be formed from extruded plastic. The keel attachment is inserted into the tapered end 88 of the groove 46 in the bottom of the canoe and is pushed longitudinally through the length of the groove.

The plastic keel attachment 50 not only covers the groove in the bottom of the canoe but also provides better wear and improves the durability of the canoe. The keel can also be replaced as desired so that the shape of the keel can be selected to provide optimum hydrodynamic performance depending upon the water conditions. For example, different keel shapes might be used for white water, flat water, etc.

The U-shaped attaching portion 26 of the keelson 21 is provided with longitudinally spaced bolt holes 54 (FIG. 7). The bolt holes permit the conventional tubular supports for the seats 22 (FIG. 1) and the athwart tubes 23 to be attached to the keelson.

In the preferred molding procedure, the mold is provided with the groove 35 for the reinforcing member, and the reinforcing member is provided with vacuum holes 31 (FIG. 6). However, the molding procedure can also be performed without a groove in the mold and without the holes in the reinforcing member. The reinforcing member can simply be placed on the mold, and when a vacuum is drawn between the mold and the heated plastic sheet, the plastic will be pulled downwardly over the reinforcing member and into the channel thereof. If a mold without a groove is used, the U-shaped attaching portion 26 of the reinforcing member is advantageously eliminated so that the channel 25 can be supported directly by the mold.

The molding procedure can be used to make any article that can be vacuum formed and can use any plastic which can be vacuum formed. The reinforcing member can be used to provide structural rigidity to the molded article, to provide a means for attaching other parts to the molded article, or both.

FIGS. 17–22 illustrate other shapes of reinforcing members. In FIG. 17 a channel-shaped reinforcing member 56 includes a pair of laterally outwardly extending flanges 57 which provide undercuts between the plastic sheet 58 and the mold 59. When a vacuum is drawn, the plastic is pulled around the flanges 57 and into the undercuts to interconnect the plastic and the reinforcing member.

Figure 18:
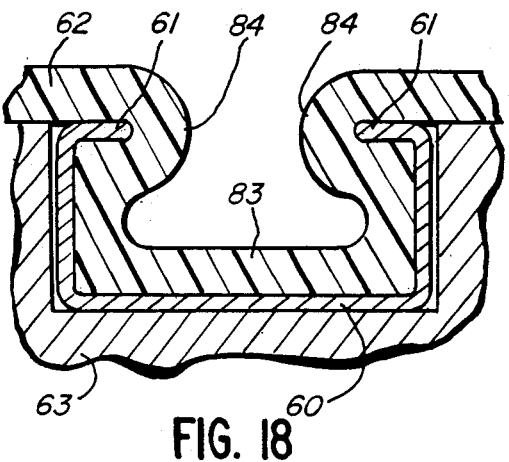

FIG. 18 illustrates a reinforcing member 60 which is similar to the keelson 21 but without the U-shaped attaching portion. The laterally extending flanges 61 provide undercuts between the plastic sheet 62 and the mold 63, and the plastic is pulled over the flanges and into the undercuts to interconnect the plastic and the reinforcing member.

Figure 19:
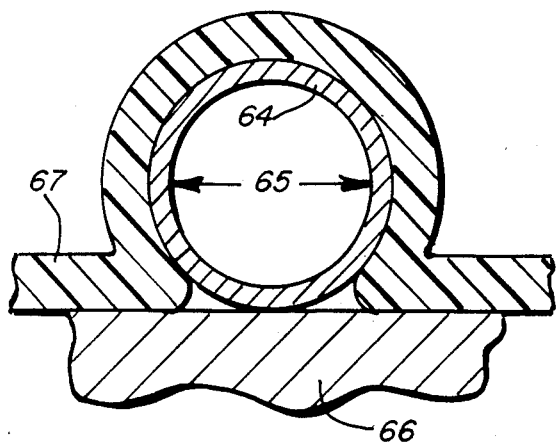

In FIG. 19 the reinforcing member 64 is a tube. The portions of the tube between the horizontal diameter 65 and the mold 66 provide undercuts between the plastic sheet 67 and the mold. The plastic is pulled around the tube and into the undercuts to interconnect the tube and the plastic.

Figure 20:
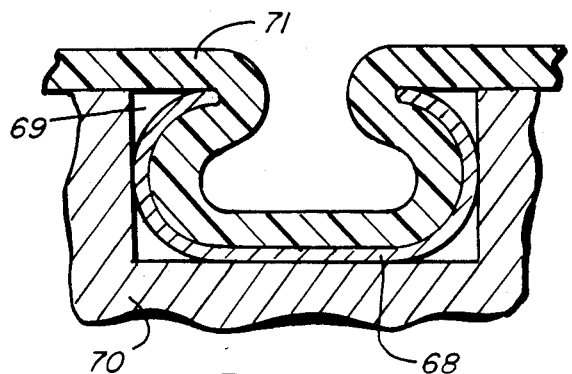

FIG. 20 illustrates a reinforcing member 68 which is similar to the reinforcing member 60 of FIG. 18. The reinforcing member 68 is positioned within a groove 69 of the mold 70, and the curved mouth of the channel-shaped reinforcing member provides undercuts between the plastic sheet 71 and the bottom of the groove of the mold.

Figure 21:
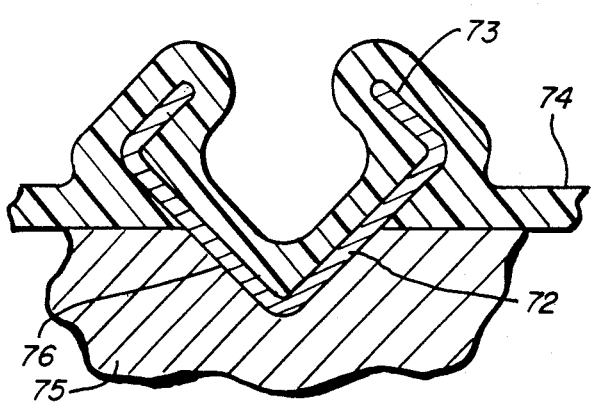

In FIG. 21 the reinforcing member 72 is V-shaped and includes a pair of converging flanges 73 which provide undercuts between the plastic sheet 74 and the mold 75. The V-shaped walls 76 also provide undercuts for interconnecting the plastic and the reinforcing member.

Figure 22:
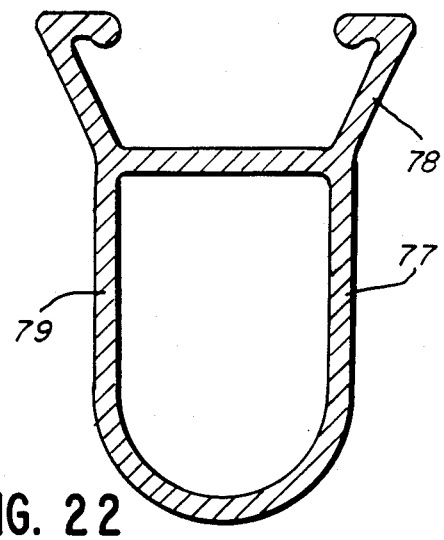

FIG. 22 illustrates a reinforcing member 77 which is similar to the keelson 21. A channel portion 78 diverges from a U-shaped portion 79.

With all of the embodiments of reinforcing members described, the shape of the reinforcing member is such that the plastic is drawn into a shape which provides an interconnecting portion which extends laterally over edge portions of the remainder of the plastic sheet to provide spaces in which the undercuts of the reinforcing member are located. For example, in FIG. 17 the plastic is shaped to provide an interconnecting portion 81 which extends laterally beyond edge portions 82 of the plastic to provide undercut spaces in which the flanges 57 of the reinforcing member are located. In FIG. 18 the plastic is shaped to provide an interconnecting portion 83 which extends laterally beyond edge portions 84 of the plastic to provide undercut spaces in which the flanges 61 of the reinforcing member are located.

While I have described the reinforcing member as being interconnected with the plastic sheet by a vacuum molding operation, it is also possible to use other forms of molding so long as the plastic is forced to conform to the undercut surfaces of the reinforcing member to provide an interconnection between the plastic and the reinforcing member. When a vacuum mold is used, it will be understood that the vacuum mold is provided with a suitable pattern of vacuum openings in accordance with conventional practice in order to draw the plastic into the desired shape. The reinforcing member can be formed from any material which will provide the desired rigidity and reinforcement to the molded plastic.

The invention can also be used to reinforce blowmolded plastic articles. In blowmolding, a parison of heated plastic is expanded by air pressure against the inside surfaces of a mold. The mold is provided with holes for evacuating the air between the plastic and the inside surface of the mold. Any of the reinforcing members illustrated in FIGS. 17-21 can be placed against the inside surface of the mold, and the plastic will be forced by air pressure into the undercut spaces between the reinforcing member and the inside surface of the mold. The reinforcing member should preferably be provided with air holes to facilitate evacuation of air between the plastic and the reinforcing member. If it is desired to have the surface of the reinforcing member be flush with the outside surface of the blowmolded plastic article, the reinforcing member is merely positioned against the inside surface of the mold without providing a groove in the mold.

Many sailboards are made from blowmolded plastic. It is desirable to provide means on the sailboard for attaching various objects, for example, leash lines, foot stirrups, etc. A leash line is conventionally attached to the mast of the sailboard to prevent the sailboard from being lost if the mast becomes disconnected from the sailboard. A short reinforcing member of the type described herein can be interconnected with the sailboard during the blowmolding operation, and the reinforcing member can thereafter be drilled and tapped to provide a bolt hole for attaching the leash line, stirrups, etc. without destroying the integrity of the plastic sailboard.

Some sailboards include a mast track which permits the position of the mast to be adjusted in the fore-and-aft direction. The invention could be utilized to provide a means for attaching such a mast track to the sailboard.

When the reinforcing member is used to provide a means of attachment to a sailboard, the reinforcing member can be relatively short and reinforces the plastic only in the area of the attachment. However, it might also be desirable to interconnect an elongated reinforcing member to a sailboat to reinforce the entire sailboard.

It will be understood from the foregoing that many different types of plastic articles can be reinforced in accordance with the invention. The reinforcing member can reinforce the entire plastic article or can reinforce only a small portion of the article to provide, for example, a location for attaching other objects to the plastic article.

While in the foregoing specification a detailed description of specific embodiments of the invention was set forth for the purpose of illustration, it will be understood that many of the details herein given may be varied considerably by those skilled in the art without departing from the spirit and scope of the invention.

I claim:

1. A method of reinforcing a molded plastic canoe comprising the steps of:
    (a) placing an elongated relatively rigid reinforcing member on a vacuum mold for the canoe, the reinforcing member providing a pair of undercuts between the top of the reinforcing member and the portion of the mold which supports the reinforcing member,
    (b) placing a heated plastic sheet over the reinforcing member and the mold,
    (c) drawing a vacuum between the plastic sheet and the mold and molding the plastic sheet about the reinforcing member and the mold so that a portion of the plastic sheet extends into the undercuts and the remainder of the plastic sheet is molded in the shape of a canoe, and
    (d) inserting an elongated keel member into a slot which is provided in the canoe by the portion of the plastic sheet which extends into the undercuts of the reinforcing member.

* * * * *